Dec. 22, 1970  J. A. HRUSOVSKY  3,550,127
AIRBORNE NAVIGATION CONVERTER
Filed Jan. 31, 1969  3 Sheets-Sheet 1 a b c a b c

INVENTOR
JOSEPH A. HRUSOVSKY
BY
Jacob Trachtman
ATTORNEY

Dec. 22, 1970   J. A. HRUSOVSKY   3,550,127
AIRBORNE NAVIGATION CONVERTER
Filed Jan. 31, 1969   3 Sheets-Sheet 3

INVENTOR
JOSEPH A. HRUSOVSKY
BY
Jacob Trachtman
ATTORNEY 3,550,127
Patented Dec. 22, 1970

3,550,127
AIRBORNE NAVIGATION CONVERTER
Joseph A. Hrusovsky, Oreland, Pa., assignor to American Electronic Laboratories, Inc., Colmar, Pa., a corporation of Pennsylvania
Filed Jan. 31, 1969, Ser. No. 795,524
Int. Cl. G01s 1/44
U.S. Cl. 343—106
10 Claims

ABSTRACT OF THE DISCLOSURE

A converter for a VHF Omnirange airborne navigation system which converts the input signal from an omni station to signals which drive a deviation indicator and an OFF/TO-FROM indicator so as to visually indicate the position of the aircraft with respect to the station. The concerter is made up of circuits which use solid state electronic components so as to eliminate inductive components and permit the circuits to be formed as small integrated microcircuits which reduce the overall size of the converter. The converter includes a pulse averaging discriminator circuit for providing the driving signal for an azimuth or course selector which provides a reference signal. A synchronous demodulator circuit compares the phase difference between the input signal to the converter and the reference signal and provides a signal which drives the deviation indicator. A phase detector circuit compares the phase difference between the input signal to the converter and the reference signal and drives the OFF/TO-FROM indicator.

---

The present invention relates to an improved airborne navigation aid, and more particularly to an improved navigation converter for a VHF Omnirange, generally called a VOR.

An airborne navigation aid which has come into recent use for controlling the course of travel of the airplane is the VHF Omnirange, generally referred to as "VOR." In the VOR system an omni station puts out two signals. One signal is all directional or omnidirectional (a 9960 Hz. subcarrier frequency modulated at a 30 Hz. rate), and the other is a rotating signal (the above omnidirectional sinal which is frequency modulated at 30 Hz. rate and further amplitude modulated at a 30 Hz. rate). The all directional signal contracts and expands 30 times a second and the rotating signal moves at 30 revolutions per second. The all directional or reference signal is timed to transmit at the same instant the rotating beam passes magnetic north.

In the aircraft there is a navigation receiver which picks up the signals and delivers them to a navigation converter. The navigation converter uses the principle of electronically measuring an angle by measuring the difference in time of receiving the two signals, and converts the information into positional information for visual display by two indicators. A course selector permits selection of any desired VOR course. A deviation indicator of the navigation converter consists of a vertical pointer which indicates the aircraft position relative to the selected course. An OFF/TO-FROM indicator of the navigation converter indicates whether the aircraft is traveling toward the omni station, away from the station or is over the station.

The airborne navigation converters presently used include conventional frequency discriminators and phase detectors to provide the positional information required for visual display. These well known circuits require the use of inductive components, such as transformers. Although such circuits operate satisfactorily, the inductive components used are relatively large in size as compared to other types of electronic components. Since the size of the electronic equipment used in present day aircraft is of major importance, it is highly desirable to be able to reduce the size of such equipment.

It is an object of the present invention to provide an improved converter for a VOR navigation system which is of reduced size as compared to presently used converters.

It is another object of the present invention to provide a converter for a VOR navigation system which used solid state components so that it can be made up of integrated microcircuits which are small in size and promotes reliability and maintainability.

These objects are achieved by a converter circuit in which the input signal from the receiver is squared and delivered to a pulse averaging discriminator circuit which is a digital logic NAND gate circuit. The pulse averaging discriminator circuit provides an output which is a train of unipolar pulses of constant width and amplitude. This output signal is filtered to provide the average value, and then delivered to an amplifier. The amplifier provides two output signals, one of which is shifted in phase from the other signal by 90 degrees, and the two signals are used to drive the stators of an azimuth or direction selector. The output signal of the rotor of the azimuth or direction selector, after amplification and squaring, is used to control the phase and frequency of a multivibrator. The multivibrator provides a pair of alternating output signals which are the triggering signals for the circuits which control the deviation indicator and the TO-FROM indicator of the VOR system.

The control circuit for the deviation indicator includes a synchronous demodulator in the form of a transistor, capacitor bridge circuit. The input signal to the synchronous demodulator is the 30 Hz. variable phase signal which is obtained by filtering out the 9960 Hz. subcarrier from the composite VOR input signal to the converter. The transistors of the synchronous demodulator are alternately triggered by the outut signals of the multivibrator. The synchronous demodulator converts the phase difference between its input signal and the triggering signal, which can be varied by shifting the position of the rotor of the azimuth or direction selector with respect to the stators, into a bipolar PAM wave form of an amplitude depending on the phase difference. At a phase difference of 90 and 270 degrees the output is zero, at 0 and 180 degrees the output is a maximum or peak value, and between these extremes the output varies linearly between 0 and the maximum. The output signal of the synchronous demodulator is then rectified by a synchronous rectifier for visual display by the deviation indicator. The synchronous rectifier is a transistor, resistor bridge circuit having the deviation indicator as its load, the bipolar PAM waveform from the synchronous demodulator as its single-ended input, and which uses the signals from the multivibrator to trigger the transistors.

The control circuit for the TO-FROM indicator includes a phase detector in the form of a transistor, resistor bridge circuit. The TO-FROM indicator is connected as the load across the phase detector. The input signal is the 30 Hz. variable phase signal which is the input signal to the synchronous demodulator but which is shifted in phase by 90 degrees. The reference signal is the output signals from the multivibrator which trigger the transistors. The phase detector provides a TO reading of the TO-FROM indicator when the phase difference between the reference signal and the variable phase signal is 0 degrees, a FROM reading when the phase difference is 180 degrees, and an OFF reading when the phase difference is 90 or 270 degrees.

Thus, the converter circuit of the present invention is essentially formed of circuits, the pulse averaging discriminator circuit, the synchronous demodulator circuit, the synchronous rectifier circuit and the phase detector circuit, which have no inductive elements, but which are made up of solid state components. This permits these various circuits to be formed as integrated microcircuits which are small in size so as to reduce the over all size of the converter circuit which is carried in the aircraft.

For the purpose of illustrating the invention there is shown in the drawings a form which is presently preferred; it being understood, however, that this invention is not limited to the precise arrangements and instrumentalities shown.

Figure 1:
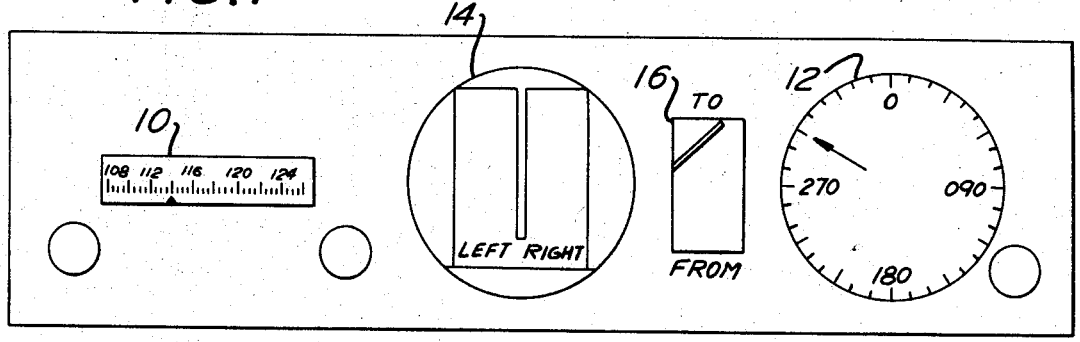
FIG. 1 is a front view of a panel having the indicators and parts of the VOR system which are in the aircraft.
Figure 1:
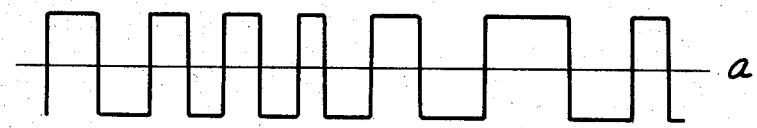
Figure 1:
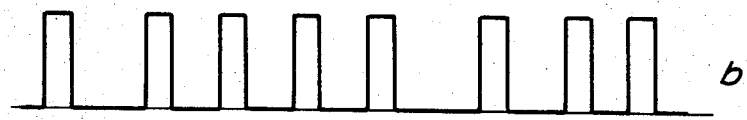

Referring initially to FIG. 1, there is shown a panel containing the components and indicators of the VOR system carried on the aircraft. These include a receiver 10 to select the frequency of the station which is to be used, an azimuth or direction selector 12 calibrated from zero degrees to 360 degrees, a deviation indicator 14 having a needle that moves left or right, and an OFF/TO-FROM indicator 16 to indicate whether the aircraft is moving toward or away from the station.

To use the VOR, the receiver 10 is tuned to the frequency of the station to be used. To determine the position of the aircraft with respect to the station, the azimuth or direction selector 12 is turned until the needle of the deviation indicator 14 is centered, and the OFF/TO-FROM indicator 16 reads "TO." The azimuth or direction selector 12 then indicates the magnetic course to follow. If the aircraft is turned on the indicated magnetic course and the needle of the deviation indicator 14 is kept centered, the aircraft will fly directly over the station. Any deviation of the aircraft from the desired course, either right or left, is indicated by a corresponding movement of the deviation indicator needle.

Figure 3:
FIG. 3 and FIG. 4 are each a set of graphs showing the operation of the pulse averaging detector of the circuit of the present invention.
Figure 3:
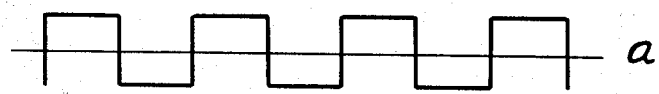
Figure 3:
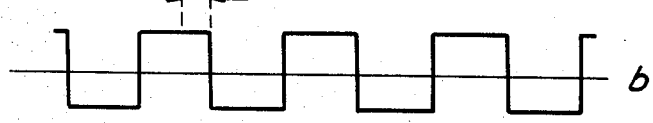
Figure 2:
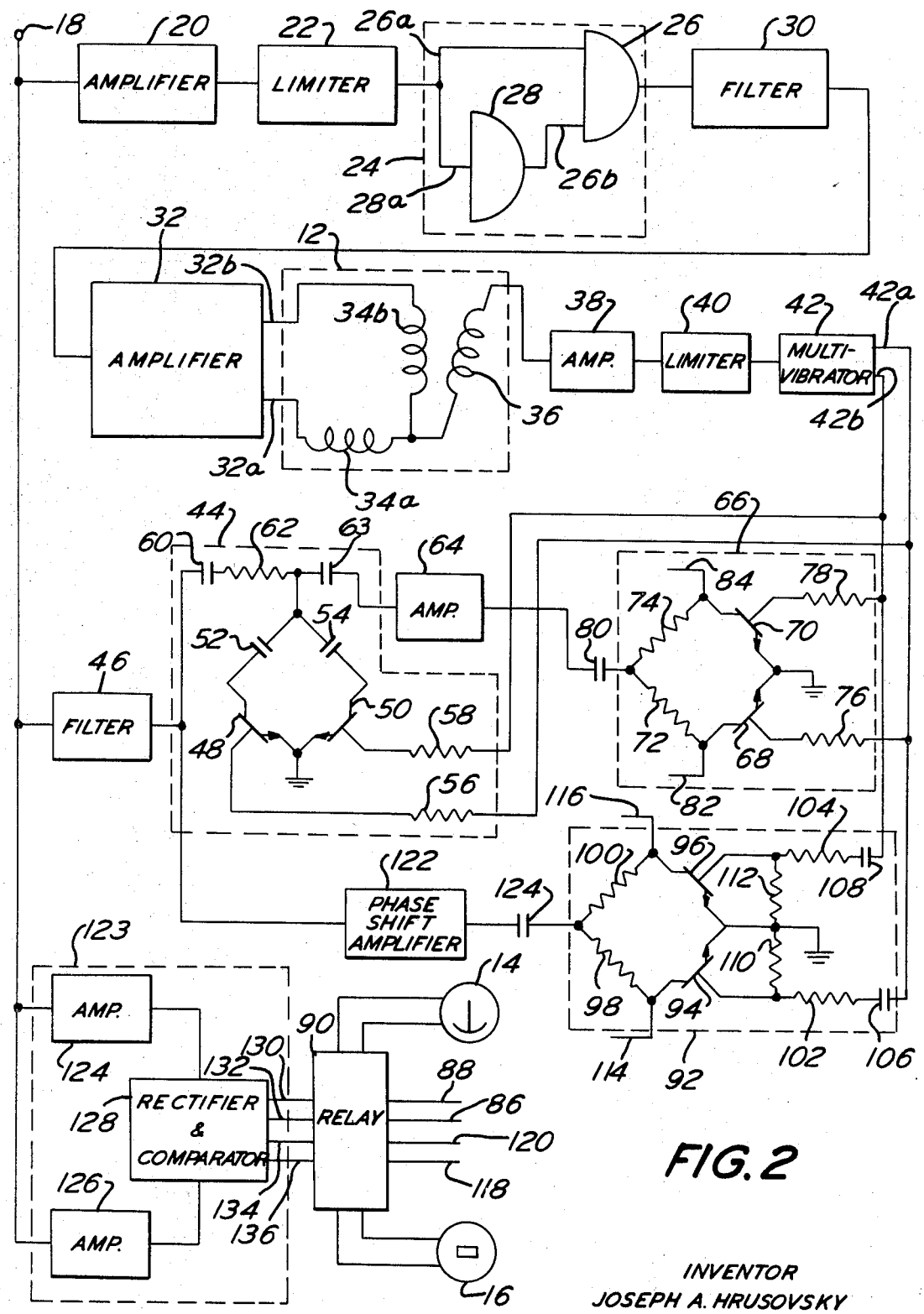
FIG. 2 is a circuit diagram of the navigation converter of the present invention.

FIG. 2 is a circuit diagram of the improved navigation converter of the present invention. This converter makes use of a pulse averaging discriminator to detect the 30 Hz. signal from the 30 Hz. frequency modulated 9960 Hz. subcarrier signal. A consideration of the nature of the FM signal and the theory of pulse counting detection is given for a clearer understanding of the pulse averaging discriminator of the circuit of the present invention. A limited FM signal consists of a train of square waves that differ only in width (see FIG. 3a). If a unipolar pulse is generated for each positive going zero crossing of the FM signal, as shown in FIG. 3b, then the average value of these pulses will be the demodulated FM signal shown in FIG. 3c which is desired. The width of the pulse generated must be less than the width of the narrowest square wave expected in the FM square wave train, and both the width and the amplitude must be maintained exactly constant regardless of the number of pulses being generated per second. Once the pulse train has been generated, simple filtering provides the average value. Since the average value is directly proportional to the number of pulses generated per second, this type of detector is inherently linear. Also, the pulse or square wave may jitter in position because of noise or imperfect limiting without seriously affecting the average value at the output. In addition, since only zero crossings are used to generate pulses, changes in square wave amplitude or wave shape will not affect the output. Thus, the demodulation system of this type would have unusually good noise rejection properties.

In the converter circuit of the present invention, the signal from the receiver is delivered to an input terminal 18. The input terminal 18 is connected to a parallel-T, frequency selective, RC tuned amplifier 20 which defines the passband and improves the threshold sensitivity of the FM system by limiting the effective noise bandwidth. The output of the amplifier 20 is delivered to a limiter 22 for forming a square wave. The square wave output signal of the limiter 22 is delivered to a pulse averaging detector circuit 24 which generates the pulses of constant width and amplitude previously referred to regardless of the rate at which the pulses are generated. The pulse averaging detector circuit 24 comprises a standard digital logic NAND gate 26, shown in detail in FIG. 5, and a NAND gate inverter 28, shown in detail in FIG. 6.

The NAND gate 26 has two input terminals 26a and 26b, and performs the logic functions of (1) when either or both inputs are at ground the output voltage is positive, (2) when both inputs are positive the output is at ground, and (3) when the signal at one input is the inverse polarity of the signal at the other input, both inputs cannot be positive at the same time and the output remains positive. The NAND gate inverter 28, which has only one input terminal 28a, functions as a polarity inverter. When its input is at ground its output is positive, and when its input is positive its output is at ground.

In the pulse averaging detector circuit 24, the square wave output signal from the limiter 22 is delivered to the input terminal 26a of the NAND gate 26 and to the input terminal 28a of the NAND gate inverter 28. The output of the NAND gate inverter 28 is delivered to the other input terminal 26b of the NAND gate 26. The NAND gate inverter 26 is constructed in a manner which will be described later so that the signal through it is delayed in time by a fixed amount. Thus, the inverted output signal from the NAND gate inverter 28 arrives at the terminal 26b of the NAND gate 26 a short time after the input signal from the limiter 22 arrives at the input terminal 26a of the NAND gate 26.

Figure 4:
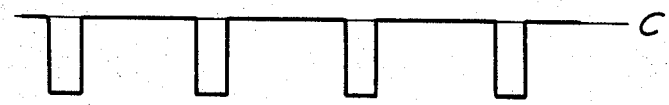

FIG. 4 is a timing diagram of the input and output signals of the pulse averaging detector circuit 24. The graph of FIG. 4a is the signal delivered from the limiter 22 to the input terminal 26a of the NAND gate 26, and the graph of FIG. 4b is the delayed inverted signal delivered from the NAND gate inverter 28 to the other terminal 26b of the NAND gate 26. As previously stated, the NAND gate 26 only produces an output when both its inputs are positive at the same time. Thus, a negative going pulse occurs at the output of the NAND gate 26 only for the period when the positive portions of the two input signals shown in FIG. 4a and FIG. 4b overlap. FIG. 4c shows the output signal from the NAND gate 26. It can be seen that one pulse is generated for each cycle of the input signal. The width of the pulse depends only on the delay of the NAND gate inverter 28, and the amplitude of the pulse depends only on the power supply of the NAND gate 26. Thus, the pulse averaging detector circuit 24 delivers the desired unipolar pulse train previously described.

Figure 5:
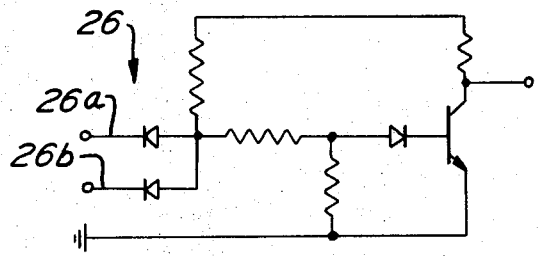
FIG. 5 is a circuit diagram of the NAND gate of the pulse averaging circuit.
Figure 6:
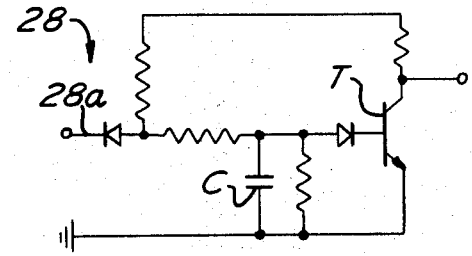
FIG. 6 is a circuit diagram of the delayed NAND gate inverter of the pulse averaging circuit.

As previously stated, NAND gate 26 is of the standard construction shown in FIG. 5. As can be seen, the NAND gate 26 is formed only of solid state components, such as a transistor, diodes, and resistors. As shown in FIG. 6, the NAND gate inverter 28 is of a circuit substantially identical to the circuit of the NAND gate 26 except that it has a single input terminal, and a capacitor C is provided between the base and the emitter of the transistor T which has the effect of greatly increasing the turn-on time delay of the circuit. Because of this base to emitter capacity, it takes an appreciable time after the appearance of a positive voltage at the input terminal 28a until the base voltage and current are sufficiently positive to permit the transistor T to conduct. It should be noted that the delay is independent of the amplitude of the input voltage or its frequency, and depends only on the power supply voltage and the turn-on characteristics of the transistor T. Since the NAND gate 26 and the NAND gate inverter 28 are formed only of solid state components, they can be formed as integrated microcircuits which greatly decrease the size of the navigation converter as well as promote its reliability and maintainability.

Referring again to FIG. 2, the output signal of the pulse averaging detector circuit 24 shown in FIG. 4c is delivered to a low pass filter 30. The filter 30 provides the average value of the pulse train as previously described with regard to FIG. 3c. The 30 Hz. reference phsae signal from the filter 30 is delivered to an amplifier 32 which provides rejection of the second harmonic component in order to decrease distortion of the signal. The amplifier 32 has two output terminals 32a and 32b, and delivers two output signals. The output signals from the amplifier 32 are identical except that the signal from the output terminal 32b is shifted in phase from the signal delivered from the output terminal 32a by 90 degrees.

The output signal from the output terminal 32a of the amplifier 32 is delivered to one stator 32a of the azimuth or direction selector 12, and the phase shifted output signal from the output terminal 32b of the amplifier 32 is delivered to the other stator 34b of the azimuth or direction selector 12. Thus, the two output signals from the amplifier 32 drive the stators 34a and 34b of the azimuth or direction selector 12 so as to permit the selection of any desired VOR course by rotating the rotor 36 with respect to the stators 34a and 34b. The output signal from the rotor 36 is first amplified by an amplifier 38, and is then formed into a square wave form by a limiter 40. The square wave output signal from the limiter 40 is delivered to a mutivibrator 42 to control the phase and frequency of the multivibrator.

The multivibrator 42 has a pair of output terminals 42a and 42b which deliver a pair of switching signals to a synchronous demodulator 44 in a manner which will be described. Also delivered to the synchronous demodulator 44 is the 30 Hz. variable phase signal which is the AM portion of the composite VOR signal. The 30 Hz. variable phase signal is obtained by delivering the input signal from the input terminal 18 to a low pass filter 46 which filters out the 9960 Hz. subcarrier from the composite VOR signal. Thus the output of the filter 46 is the desired 30 Hz. variable phase signal which is delivered to the synchronous demodulator. Perfect synchronism always exists between the 30 Hz. switching voltage of the multivibrator 42 and the 30 Hz. variable phase signal from the filter 46 since both components of the VOR, reference and variable, are derived from the same 30 Hz. source and therefore possess coherency.

The synchronous demodulator comprises a bridge circuit having a transistor 48 in one arm, a second transistor 50 in an adjacent arm, and capacitors 52 and 54 in the other two arms respectively. The transistors 48 and 50 are connected in the bridge circuit with their emitters connected together and to ground, and their collectors connected to one side of the capacitors 52 and 54 respectively. The other sides of the capacitors 52 and 54 are connected together. The output terminals 42a and 42b of the multivibrator 42 are connected through resistors 56 and 58 respectively to the bases of the transistors 48 and 50 respectively. The output of the filter 46 is connected to the common junction of the capacitors 52 and 54 through a capacitor 60 and a resistor 62.

The 30 Hz. switching voltage from the multivibrator 42 causes transistors 48 and 50 to conduct alternately on successive half-cycles when the bases of the transistors are driven positive with respect to their emitters. Thus, transistors 48 and 50 operate in the manner of an automatic single-pole, double-throw switch, in which the pole moves from one contact to the other during each cycle of the 30 Hz. switching voltage.

Figure 7:
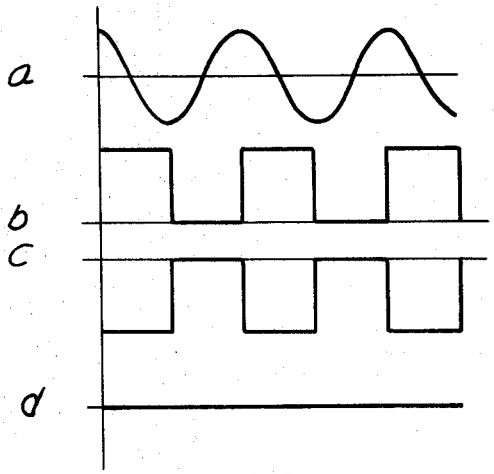
FIG. 7 is a set of graphs showing the operation of the synchronous demodulator of the circuit of the present invention in its in phase condition.

The 30 Hz. variable phase input signal from the filter 46 to the synchronous demodulator 44 varies in phase with the 30 Hz. switching voltage from the multivibrator 42 to the bases of the transistors 48 and 50. If the incoming variable phase input signal is 90 degrees out of phase with the 30 Hz. switching voltage applied to the bases of the transistors 48 and 50 and is positive when transistor 48 is turned on, capacitor 52 acquires a small positive charge. During the negative half-cycle of the input signal, capacitor 52 loses the charge it just gained. During the succeeding cycle of the input signal, the same effect occurs with capacitor 54. Thus, the net change in charges stored in capacitors 52 and 54 for one cycle of applied signal is zero. This can be seen in FIG. 7 where FIG. 7a is the input signal from the filter 46, FIG. 7b is the signal applied to the base of transistor 48, FIG. 7c is the signal applied to the base of transistor 50, and FIG. 7d is the output from the synchronous demodulator.

Figure 8:
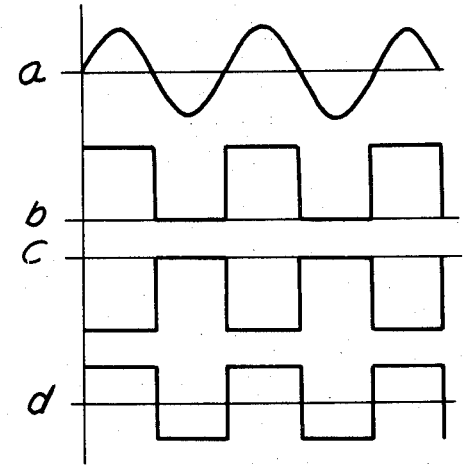
FIG. 8 is a set of graphs showing the operation of the synchronous demodulator in its quadrature phase condition.

However, now consider the in-phase condition between the switching signal from the multivibrator 42 and the variable phase signal from the filter 46 which is accomplished by permanently shifting the phase of the 30 Hz. switching voltage 90 degrees, by mechanically shifting the position of the rotor 36 of the azimuth or direction selector with respect to the stators 34a and 34b. If the variable phase signal from the filter 46 is in phase with the 30 Hz. switching signal from the multivibrator 42 and positive when transistor 48 is turned on, capacitor 52 will acquire a small positive charge. The charge is small because of the relatively long time constant of resistor 62 and capacitor 52 compared to the duration of the positive half-cycle of the 30 Hz. variable phase signal. During the next half-cycle of the variable phase input, signal transistor 50 is turned on and capacitor 54 acquires a small negative charge. As long as the input signal exists this process continues until capacitor 52 is charged positively to the peak level of the positive half-cycle of the input signal, and capacitor 54 is charged negatively to the peak level of the negative half-cycle of the input signal. This can be seen in FIG. 8 where FIG. 8a is the input signal, FIG. 8b is the signal applied to the base of transistor 48, FIG. 8c is the signal applied to the base of transistor 50, and FIG. 8d is the output signal of the synchronous demodulator 44. A voltage amplifier 64 is connected by capacitor 63 to the common junction of the capacitors 52 and 54 so that the amplifier 64 is connected alternately to the capacitors 52 and 54 during successive half-cycles of the switching signal. Once the capacitors 52 and 54 are charged, the ampiifier input sees a square wave signal as shown in FIG. 8d.

Figure 9:
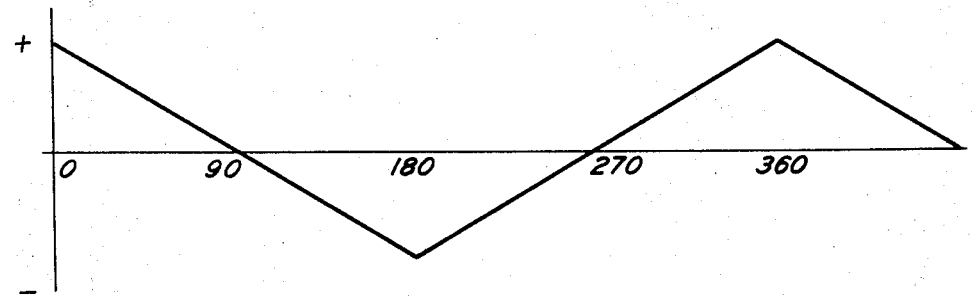
FIG. 9 is a graph showing the output of the synchronous demodulator for different phase differences between the input signal and the switching signal.

As shown in FIG. 9, when the phase of the incoming signal from the filter 46 lies between 0 and 90 degrees, 90 and 180 degrees, 180 and 270 degrees, and 270 and 360 degrees, capacitors 52 and 54 will acquire a charge which varies linearly with the phase difference between the incoming signal and the switching signal from the multivibrator 42. At 90 degrees and 270 degrees the charge will be a minimum or zero, and at 0 degrees and 180 degrees the charge will be a maximum or the peak value of the input signal. At phase differences between these extremes, the charge will be greater than zero but less than the maximum and will correspond to the phase difference. Thus, the phase difference between the 30 Hz. variable phase signal and the 30 Hz. reference phase signal is converted by the synchronous demodulator 44 into a bipolar PAM waveform which remains to be rectified in order to provide the positional information necessary for visual display by the deviation indicator 14.

The bipolar PAM waveform from the amplifier 64 is delivered to a synchronous rectifier 66 which drives the deviation indicator 14. The rectifier 66 is a transistor triggered bridge circuit having a single ended source and the deviation indicator 14 as the load. The bridge circuit of the rectifier 66 has transistors 68 and 70 in two adjacent arms, and resistors 72 and 74 in the other two arms. The emitters of the transistors 68 and 70 are connected together and to ground. The collectors of the transistors 68 and 70 are connected to one side of the resistors 72 and 74 respectively, and the other side of the resistors 72 and 74 are connected together. The bases of the transistors 68 and 70 are connected respectively through resistors 76 and 78 respectively to the output terminals 42a and 42b respectively of the multivibrator 42 so that the output signals of the multivibrator 42 alternately trigger the transistors 68 and 70. The bipolar PAM waveform signal from the amplifier 64 is delivered through a capacitor 80 to the common junction of the resistors 72 and 74. Output terminals 82 and 84 respectively, at the junction of the transistor 68 with resistor 72 and the transistor 70 with resistor 74, are connected to the input terminals 86 and 88 of a four position, double throw relay 90. The input terminals 86 and 88 are connected through the relay 90 to the deviation indicator 14.

As previously stated, the amplified, bipolar PAM waveform is the input signal to the synchronous rectifier 66, and the trigger signal is the 30 Hz. switching signal supplied by the multivibrator 42. Also as previously stated, perfect synchronism always exists between the 30 Hz. switching signal and the 30 Hz. bipolar PAM waveform which was originally derived from the 30 Hz. switching signal. Depending upon the relationship between the PAM waveform and the switching signal at any instant, the deviation indicator will deflect either left, when the bipolar PAM waveform is negative, or right, when the bipolar PAM waveform is positive, or remain centered if the bipolar PAM waveform is zero. Maximum deflection, either left or right, will occur at the 0 and 180 degree points of the output of the synchronous demodulator 44.

The synchronous rectifier circuit 66 has several inherent advantages over other types of meter rectifier circuits. Since the transistors are used only as on-off devices and no DC amplification is required at the output, there is essentially no DC drift. Therefore, zero adjustment is not needed. Also, since it is a bridge circuit it operates at high efficiency from a single ended signal source. This eliminates the need for transformers and phase inverters. Also, the rectifier circuit 66 is formed of only solid state components so that it can be made as an integrated microcircuit device which is small in size.

To operate the OFF/TO-FROM indicator 16, a phase detector 92 is used. The phase detector 92 is a transistor triggered bridge circuit similar to the bridge circuit of the synchronous rectifier. The bridge circuit of the phase detector 92 includes transistors 94 and 96 in two adjacent arms of the circuit, and resistors 97 and 100 in the other arms of the circuit. The emitters of the transistors 94 and 96 are connected together and to ground, and the collectors of the transistors 94 and 96 are connected to one end of the resistors 98 and 100 respectively. The other ends of the resistors 98 and 100 are connected together. The bases of the transistors 94 and 96 are respectively connected through resistors 102 and 104 respectively and capacitors 106 and 108 respectively to the output terminals 42a and 42b respectively of the multivibrator 42 so that the output signals of the multivibrator 42 alternately trigger the transistors 94 and 96. Base to emitter resistors 110 and 112 are provided for the transistors 94 and 96. Output terminals 114 and 116 respectively at the junction of the transistor 94 and resistor 98, and at the junction of the transistor 96 and resistor 100 are connected to the input terminals 118 and 120 respectively of the relay 90.

The relay 90 connects the input terminals 118 and 120 to the OFF/TO-FROM indicator 16. The input to the phase detector 92 is the 30 Hz. variable phase signal from the filter 46 which is shifted in phase by 90 degrees by the phase shift amplifier 122 and delivered through a capacitor 124 to the junction of the resistors 98 and 100 of the bridge circuit of the phase detector.

The phase detector 92 provides a TO reading of the OFF/TO-FROM indicator 16 when the phase difference between the reference signal and the variable signal is 0 degrees, a FROM reading when the phase difference is 180 degrees, and an OFF reading when the phase difference is 90 or 270 degrees. The phase detector 92 has the same advantages previously described as the synchronous rectifier circuit 66. However, the phase detector 92 need not possess the accuracy of the synchronous demodulator 44 since it only provides maximum positive (TO), maximum negative (FROM), and zero (OFF) indications.

A localizer circuit 123 is provided to operate the deviation indicator 14 and OFF/TO-FROM indicator 16 when the aircraft is landing at a station. The localizer circuit 122 includes parallel-T, frequency selective, RC tuned amplifiers 124 and 126 each connected to the input terminal 18. The amplifier 124 is tuned at 90 Hz. and the amplifier 126 is tuned at 150 Hz. The outputs of the amplifiers 124 and 126 are connected to a rectifier and comparator 128. The rectifier and comparator 128 has a first pair of output terminals 130 and 132 which are connected through the relay 90 to the deviation indicator 14, and a second pair of output terminals 134 and 136 which are connected through the relay to the OFF/TO-FROM indicator 16.

Thus, there is provided by the present invention a converter for a VHF Omnirange airborne navigation system which converts the input signal from an omni station into positional information for visual display without the use of inductive components. The converter of the present invention is formed of circuits made up of solid state components so that such circuits can be provided as integrated microcircuit devices. This reduces the overall size of the converter so as to save weight and space in the aircraft as well as promote the reliability and maintainability of the converter.

The present invention may be embodied in other specific forms without departing from the spirit or essential attributes thereof and, accordingly, reference should be made to the appended claims, rather than to the foregoing specification as indicating the scope of the invention.

What is claimed is:

1. In a VHF Omnirange aircraft navigation system which includes a course direction selector, a deviation indicator and an OFF/TO-FROM indicator, a converter circuit for converting an input signal into positional information for visual display by said indicators comprising:
   (a) an input terminal for receiving the input signal from a receiver;
   (b) first circuit means receiving the input signal from the input terminal and delivering a first output signal which is a train of unipolar pulses of constant width and amplitude;
   (c) second circuit means receiving the first output signal from said first circuit means and delivering two second output signals each of which is the average value of the first output signal and one of which is shifted in phase from the other by 90 degrees;
   (d) a course direction selector including a pair of stator coils and a rotor coil shiftable in position with regard to said stator coils, each of said stator coils receiving a separate one of said second output signals from said second circuit means and the rotor coils providing an output signal;
   (e) a multivibrator receiving the output signal of the rotor of the course direction selector to control the phase and frequency of the multivibrator and alternately delivering a pair of reference signals;

(f) third circuit means receiving the input signal from the input terminal and the reference signals from the multivibrator, and delivering a third output signal which is of an amplitude depending on the phase difference between the input signal and the reference signal;

(g) fourth circuit means receiving the third output signal from the third circuit means and rectifying said third output signal for operating the deviation indicator; and (h) fifth circuit means receiving the input signal from the input terminal and the reference signals from the multivibrator and delivering a fifth output signal for operating the OFF/TO-FROM indicator depending on the phase difference between the input signal and the reference signal.

2. A converter circuit in accordance with claim 1 in which the first circuit means is a pulse averaging discriminator circuit.

3. A converter circuit in accordance with claim 2 in which the pulse averaging discriminator circuit includes a digital logic NAND gate circuit having a pair of input terminals and an output terminal, and a time delay NAND gate inverter circuit having a signal input terminal and an output terminal, the input signal from the input terminal being delivered to one of the input terminals of the NAND gate circuit and to the input terminal of the time delay NAND gate inverter circuit, and the output signal of the time delay NAND gate inverter circuit being delivered to the other input terminal of the NAND gate circuit.

4. A converter circuit in accordance with claim 3 including means for forming the input signal as a square wave signal before delivering said signal to the pulse averaging discriminator circuit.

5. A converter circuit in accordance with claim 1 in which the third circuit means comprises a synchronous demodulator.

6. A converter circuit in accordance with claim 5 in which the synchronous demodulator includes a bridge circuit having a separate transistor in each of two adjacent arms and a separate capacitor in each of the other two arms, the emitters of the transistors are connected together and to ground, the collectors of the transistors are each connected to one plate of a separate one of the capacitors, the other plates of the capacitors are connected together, the input signal from the input terminal is delivered to the common connection of the capacitors, the reference signals from the multivibrators are each delivered to the base of a separate one of the transistors so as to alternately trigger the transistors, and the third output signal is delivered from the common connection of the capacitors.

7. A converter circuit in accordance with claim 6 in which the fifth circuit means comprises a synchronous rectifier.

8. A converter circuit in accordance with claim 7 in which the synchronous rectifier comprises a bridge circuit having a separate transistor in each of two adjacent arms and a separate resistor in each of the other two arms, the emitters of the transistors being connected together and to ground, the collectors of the transistors each being connected to one end of a separate one of the resistors, the other ends of the resistors being connected together, the third output signal from the synchronous demodulator being delivered to the common junction of the resistors, the reference signals from the multivibrator each being delivered to the base of a separate one of the transistors so as to alternately trigger the transistors, and a separate output terminal at the connection of each of the transistors and its adjacent resistor, said output terminal delivering the output signal of the rectifier to the deviation indicator.

9. A converter circuit in accordance with claim 1 in which the fifth circuit means comprises a bridge circuit having a separate transistor in each of two adjacent arms and a separate resistor in each of the other two arms, the emitters of the transistors being connected together and to ground, the collectors of the transistors each being connected to one end of a separate one of the resistors, the other ends of the resistors being connected together, the input signal from the input terminal being delivered to the common junction of the resistors, the reference signals from the multivibrator each being delivered to the base of a separate one of the transistors so as to alternately trigger the transistors, and a separate output terminal at the connection of each of the transistors and its adjacent resistor, said output terminals delivering the output signal to the OFF/TO-FROM indicator.

10. A converter circuit in accordance with claim 9 including means for shifting the phase of the input signal from the input terminal by 90 degrees before the input signal is delivered to the fifth circuit means.

References Cited

UNITED STATES PATENTS

| | | | |
|---|---|---|---|
| 2,778,004 | 1/1957 | Lear et al. | 340—27 |
| 2,810,119 | 10/1957 | Brown | 340—27 |
| 3,142,062 | 7/1964 | Held | 343—106 |

RODNEY D. BENNETT, Primary Examiner

R. E. BERGER, Assistant Examiner

U.S. Cl. X.R.

340—27; 343—112